US010704453B2

(12) United States Patent
Park et al.

(10) Patent No.: US 10,704,453 B2
(45) Date of Patent: Jul. 7, 2020

(54) FLOW CONTROL VALVE

(71) Applicants: Hyundai Motor Company, Seoul (KR); Kia Motors Corporation, Seoul (KR)

(72) Inventors: Cheol Soo Park, Gyeonggi-do (KR); Jun Sik Park, Seoul (KR); Bong Hoon Han, Seoul (KR); Dong Suk Chae, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 240 days.

(21) Appl. No.: 15/824,603

(22) Filed: Nov. 28, 2017

(65) Prior Publication Data
US 2019/0055877 A1 Feb. 21, 2019

(30) Foreign Application Priority Data
Aug. 17, 2017 (KR) .................. 10-2017-0104000

(51) Int. Cl.
*F01P 7/14* (2006.01)
*F01P 3/02* (2006.01)
*F16K 11/085* (2006.01)
*F01M 5/00* (2006.01)
*F01P 7/16* (2006.01)
(Continued)

(52) U.S. Cl.
CPC .............. *F01P 7/14* (2013.01); *F01M 5/002* (2013.01); *F01P 3/02* (2013.01); *F01P 7/165* (2013.01); *F16K 11/08* (2013.01); *F16K 11/0856* (2013.01); *F01P 2003/027* (2013.01); *F01P 2007/146* (2013.01); *F01P 2025/32* (2013.01); *F01P 2060/08* (2013.01); *F01P 2060/18* (2013.01); *F02M 26/30* (2016.02)

(58) Field of Classification Search
CPC    F01P 7/14; F01P 3/02; F01P 2007/146; F01P 2060/18; F01P 7/165; F01P 2060/08; F01P 2025/32; F01P 2003/027; F01M 5/002; F16K 11/0856; F16K 11/08; F16K 27/06; F16K 5/08; F02M 26/30
See application file for complete search history.

(56) References Cited

U.S. PATENT DOCUMENTS 6,681,805 B2 * 1/2004 McLane ............. B60H 1/00485
                                                137/625.16
7,255,130 B2 * 8/2007 Martins ............. B60H 1/00485
                                                123/41.08
(Continued)

FOREIGN PATENT DOCUMENTS

JP          2004-137981 A      5/2004

Primary Examiner — Joseph J Dallo
Assistant Examiner — Kurt Philip Liethen
(74) Attorney, Agent, or Firm — Mintz Levin Cohn Ferris Glovsky and Popeo, P.C.; Peter F. Corless

(57) ABSTRACT

A flow control valve is arranged to simultaneously perform coolant flow control and variable split cooling, according to control of a path opening degree of the flow control valve. The flow control valve can perform four-port control for variably controlling four ports at once by operation of the flow control valve, and thus can implement variable temperature control for increasing a temperature of an engine, rapid warming-up of the engine, while performing split cooling at the same time.

13 Claims, 16 Drawing Sheets

(51) Int. Cl.
*F16K 11/08* (2006.01)
*F02M 26/30* (2016.01)

(56) References Cited

U.S. PATENT DOCUMENTS

| | | | |
|---|---|---|---|
| 9,032,915 B2* | 5/2015 | Tobergte | F01P 3/02 |
| | | | 123/41.01 |
| 2016/0061091 A1* | 3/2016 | Hosokawa | F01P 7/164 |
| | | | 123/41.09 |
| 2016/0341100 A1* | 11/2016 | Nagai | F01N 3/0205 |
| 2017/0122181 A1* | 5/2017 | Murakami | F16K 31/041 |

* cited by examiner

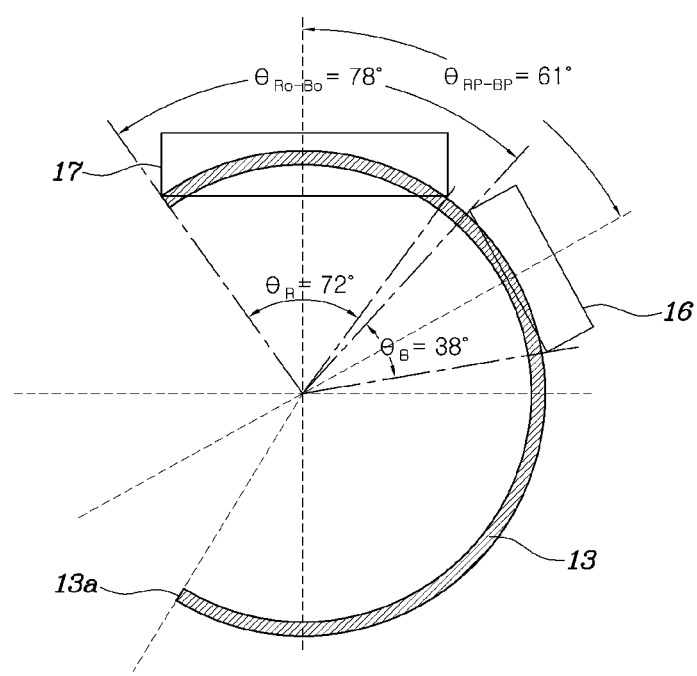

(Valve operation angle of 50°)

(Valve operation angle of 128°)

(Valve operation angle of 155°)

(Valve operation angle of 235°)

FLOW CONTROL VALVE

CROSS REFERENCE TO RELATED APPLICATION

The present application claims under 35 U.S.C. § 119(a) the benefit of Korean Patent Application No. 10-2017-0104000 filed on Aug. 17, 2017, the entire contents of which are incorporated by reference herein.

BACKGROUND

(a) Technical Field

The present disclosure relates to a flow control valve, more particularly to an integrated flow control valve for vehicle coolant, in which the flow control valve can simultaneously perform flow control of each part of a heat exchanger and cooling components, and a variable split cooling technique for variably and separately cooling each of a cylinder head and a cylinder block, according to control of a path opening degree of the flow control valve.

(b) Description of the Related Art

Fuel economy of an engine is reduced in a cold state, such as when a vehicle is initially started, compared to a sufficiently warmed-up condition. In particular, in a cold state, the friction of an engine is large due to high viscosity of oil when the oil has a low temperature, a low temperature of a cylinder wall surface causes large heat loss thereto, and combustion stability degrades.

Therefore, in order to improve fuel economy of a vehicle and durability of an engine, it is required to quickly increase a temperature of the engine to a normal temperature upon an initial start.

An engine heat management control can maximally utilize heat generated in an engine during a start in a cold state to warm up the engine so as to obtain effects including fuel economy improvement, vehicle power improvement, and exhaust gas reduction. Representative technologies include a flow stop valve, a clutch-type water pump, an electric water pump, and an integrated flow control valve.

Among these, the flow stop valve is a controllable valve disposed at an outlet or a supply side of the engine, and stops the flow of coolant of the engine during warming up of the engine to thus shorten the time required to warm up the engine. Similarly, the clutch-type water pump and the electric water pump are controlled in a manner similar to the flow stop valve so as to implement rapid warming up of the engine.

Meanwhile, the integrated flow control valve not only controls simple stoppage of flow of coolant in the engine, but also minutely and variably controls a flow rate to preferentially supply heated coolant to an oil warmer or an ATF warmer. Accordingly, the integrated flow control valve rapidly increases the temperatures of engine oil, transmission oil, and the entire engine at the same time, and thus implements optimal and rapid warming-up of the engine.

However, when the temperature of the entire engine is increased in order to reduce friction of an engine piston and minimize cooling loss, the temperature of a cylinder liner is increased, and piston friction loss is decreased, whereby fuel economy is improved.

Meanwhile, the temperature of a metal surface of a combustion chamber is increased so that abnormal combustion, such as knocking and pre-ignition, may occur to thus degrade combustion stability. Cylinder head/block variable split cooling technology may address this problem by maintaining a cylinder block at a high temperature and maintaining a head part of a combustion chamber at a low temperature. That is, the periphery of the combustion chamber is maintained at a low temperature to maintain combustion stability, and a coolant of a cylinder block is maintained at a high temperature to thus reduce friction between a piston and a cylinder liner so as to enhance the fuel economy.

The integrated flow control valve adjusts a path opening degree of a port connected to each flow passage to reach a target value through control of a motor, so as to enable the valve to open or close. Therefore, the valve can control the flow rate of coolant introduced and discharged through each port.

However, existing methods for controlling the integrated flow control valve do not involve variable split cooling of a cylinder head and a cylinder block. Therefore, a need emerges for a control technology capable of performing both coolant flow control and variable split cooling through each port according to control of a path opening degree by an integrated flow control valve.

The above description in this background section is merely for improving understanding of the background of the present disclosure, and should not be taken as an acknowledgement indicating that the information forms a prior art that is already known to a person skilled in the art.

SUMMARY

The present disclosure provides a flow control valve capable of performing both variable split cooling and coolant flow control according to control of a path opening degree of the flow control valve.

In accordance with the above aspect, the present disclosure may include: a valve housing including a block port connected to a coolant outlet of a cylinder block, a radiator port connected to a radiator, a heat exchanger port connected to an oil cooler or an EGR cooler, and a heater core port connected to a heater core; a driving unit that provides a rotational force; and a valve body that receives the rotational force provided from the driving unit to rotate in the valve housing at a predetermined angle, and has a first flow control hole, a second flow control hole, and a third flow control hole which are formed through the valve body such that the first flow control hole selectively communicates with the block port and the radiator port, the second flow control hole selectively communicates with the heat exchanger port, and the third flow control hole selectively communicates with the heater core port, according to changes of a rotation angle of the valve body.

The valve body may include a first layer part, a second layer part, and a third layer part, which are discriminated from each other along an axial direction of the valve body; the first layer part may have the first flow control hole formed therethrough; and the block port and the radiator port may be independently arranged along a circumferential direction of the first layer part.

The second layer part may have a second flow control hole formed therethrough, and the heat exchanger port may be disposed on the second layer part; and the third layer part may have a third flow control hole formed therethrough, and the heater core port may be disposed on the third layer part.

The first flow control hole, the second flow control hole, and the third flow control hole may be respectively arranged through the first layer part, the second layer part, and the third layer part, along circumferential directions of respective parts.

The radiator port may be configured to be opened before the block port as the valve body rotates from one end to the other end among an entire rotation section of the valve body.

An inside diameter of the radiator port may be larger than that of the block port, and the block port may be configured to start opening before a time point at which the radiator port is maximally opened, as the valve body rotates from the one end to the other end.

As the first flow control hole overlaps the radiator port and the block port, the first flow control hole may communicate with the radiator port and the block port to allow flow of a coolant; the first flow control hole may be formed such that the first flow control hole does not overlap either the radiator port or the block port in a predetermined first section including the one end among the entire rotation section of the valve body; the first flow control hole may be formed such that the first flow control hole overlaps the radiator port and does not overlap the block port in a predetermined second section extending from the first section and connected to an opposite side of the first section; the first flow control hole may be formed such that the first flow control hole overlaps both the radiator port and the block port in a predetermined third section extending from the second section and connected to an opposite side of the second section; and the first flow control hole may be formed such that the first flow control hole does not overlap the radiator port and overlaps the block port in a fourth section which extends from the third section, is connected to an opposite side of the third section, and includes the other end.

The third section may include: a (3-1)th section extending from the opposite side of the second section, wherein an overlapping state between the first flow control hole and the block port is converted at a boundary point between the (3-1)th section and the second section; a (3-2)th section extending from an opposite side of the (3-1)th section, wherein an overlapping area between the first flow control hole and the radiator port is maximized in the (3-2)th section; and a (3-3)th section disposed between the (3-2)th section and the fourth section, wherein an overlapping state between the first flow control hole and the radiator port is converted at a boundary point between the (3-3)th section and the fourth section.

The heat exchanger port and the heater core port may be configured to be opened before the radiator port as the valve body rotates from the one end to the other end.

As the second flow control hole overlaps the heat exchanger port, the second flow control hole may communicate with the heat exchanger port to allow flow of a coolant; the second flow control hole may be formed such that the second flow control hole does not overlap the heat exchanger port in a (1-1)th section which is shorter than the first section and includes the one end among the entire rotation section of the valve body; the second flow control hole may be formed to overlap the heat exchanger port in a (1-2)th section extending from the (1-1)th section and connected to an opposite side of the (1-1)th section, the second section, the third section, and a (4-1)th section which extends from the opposite side of the third section and is shorter than the fourth section; and the second flow control hole may be formed such that the second flow control hole does not overlap the heat exchanger port in a (4-2)th section which includes the other end, extends from the (4-1)th section, and is connected to an opposite side of the (4-1)th section.

The second flow control hole may be formed such that the heat exchanger port has a minimum overlapping area with the second flow control hole in a section in which the radiator port has a maximum overlapping area with the first flow control hole among the third section.

The second flow control hole may be formed such that an axial width of a middle portion thereof is narrower than that of a remaining part thereof.

As the third flow control hole overlaps the heater core port, the third flow control hole may communicate with the heater core port to allow flow of a coolant; the third flow control hole may be formed such that the third flow control hole does not overlap the heater core port in the (1-1)th section which is shorter than the first section and includes the one end among the entire rotation section of the valve body; and the third flow control hole may be formed to overlap the heat core port in a (1-2)th section extending from the (1-1)th section and connected to the opposite side of the (1-1)th section, the second section, the third section, and the fourth section.

The third flow control hole may be formed such that the heater core port has a minimum overlapping area with the third flow control hole in a section in which the radiator port has a maximum overlapping area with the first flow control hole among the third section.

The third flow control hole may be formed such that an axial width of a middle portion thereof is narrower than that of a remaining part thereof.

Through the solutions described above, the present disclosure can perform four-port control for variably controlling four ports at once through the operation of only a flow control valve, and thus can simultaneously implement a variable temperature control technique for increasing the temperature of an entire engine, rapid warming-up of an engine, and a split cooling technique, so as to maximize an improvement in fuel economy. Further, the present disclosure does not require a separate port control structure for implementing a split cooling technique, thereby reducing production costs.

Also, the present disclosure configures various control sections of a flow control valve depending on driving conditions of the vehicle, the flow control valve being controlled by sequentially passing the control sections, and thus can reduce an operation distance and a number of operations of the flow control valve.

Further, the present disclosure configures a first heating section, so that there is no coolant flow loss due to unnecessary flow to an oil heat exchanger or an EGR cooler while a flow rate to the heater core side is maximized. Therefore, it is possible to maximize the improvement in fuel economy and the heating performance. In addition, the present disclosure can maximize vehicle cooling performance in high-load conditions, such as when climbing a steep hill.

BRIEF DESCRIPTION OF THE DRAWINGS

The above and other aspects, features and advantages of the present disclosure will be more apparent from the following detailed description taken in conjunction with the accompanying drawings, in which:

FIG. 5 is a schematic diagram for explaining a layout design of a block port and a radiator port according to the present disclosure;

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

An exemplary embodiment of the present disclosure will be described in detail with reference to the accompanying drawings in the following description.

Figure 1:
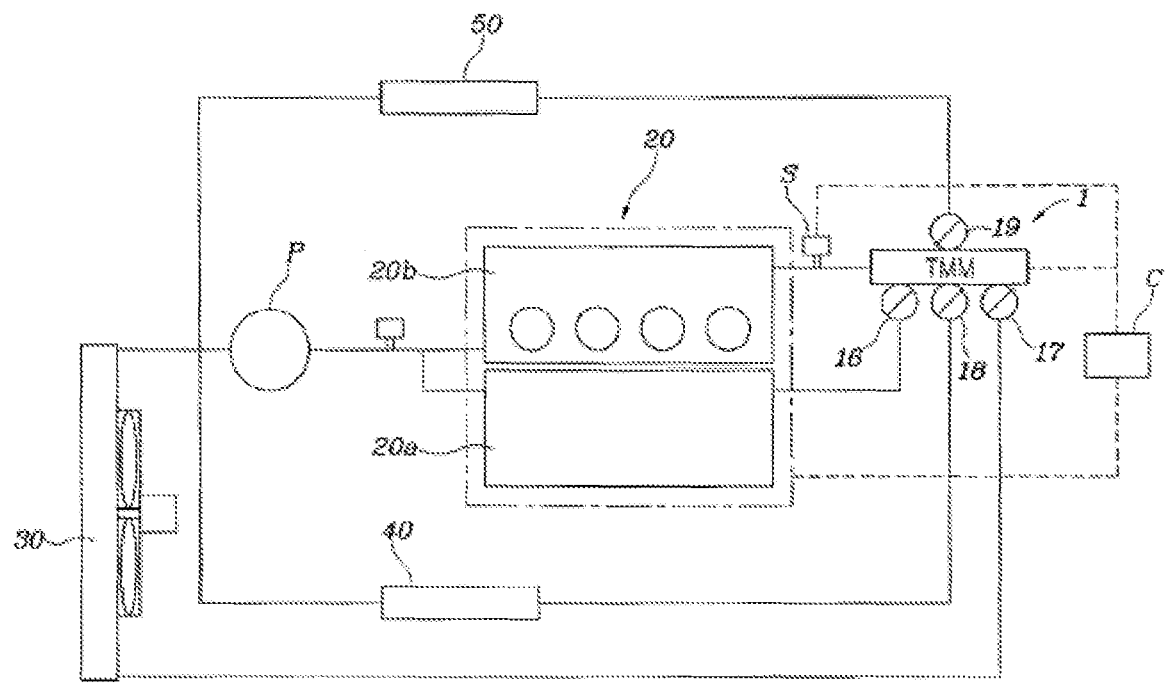
FIG. 1 is a schematic diagram of a configuration of a cooling circuit in which a flow control valve of an exemplary embodiment of the present disclosure is disposed.

FIG. 1 illustrates a vehicle cooling circuit applicable to the present disclosure, and a flow control valve 1 of the present disclosure may be disposed in the cooling circuit.

Particularly, a coolant outlet of a cylinder block 20a of an engine 20 and a coolant outlet of a cylinder head 20b are independently connected to the flow control valve 1.

A block port 16 is disposed through part of the flow control valve 1, and is connected to the coolant outlet of the cylinder block 20a so as to control the flow rate of coolant introduced into the flow control valve 1.

In addition, each of at least three discharge ports is arranged through the flow control valve 1, and respective discharge ports are respectively connected to a radiator 30, a heat exchanger 40, such as an oil cooler or an EGR cooler, and a heater core 50, so as to control the flow rate of coolant discharged from the flow control valve 1.

The discharge port may be a radiator port 17, a heat exchanger port 18, and a heater core port 19, and will be described below. Reference numeral S may indicate a coolant temperature sensor, and reference numeral P may indicate a water pump.

The flow control valve according to the present disclosure may include a valve housing 10, a driving unit 11, and a valve body 12.

Figure 2:
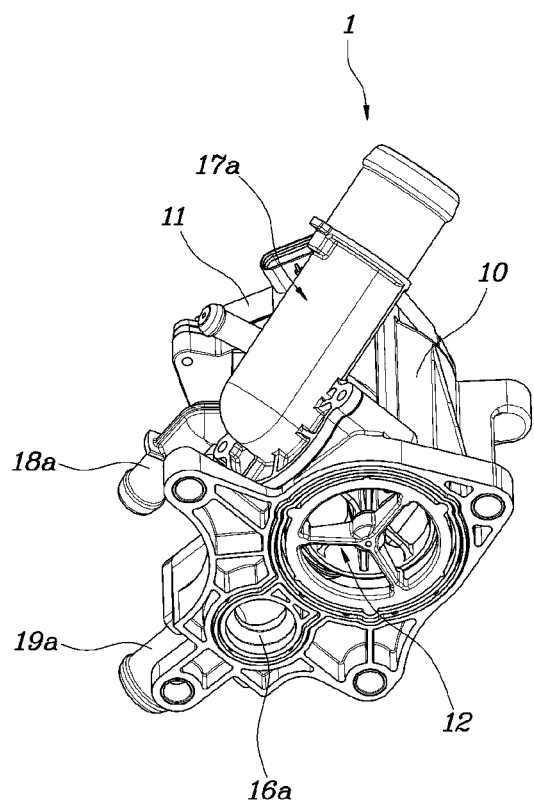
FIG. 2 is a perspective view illustrating a flow control valve according to the present disclosure.
Figure 3:
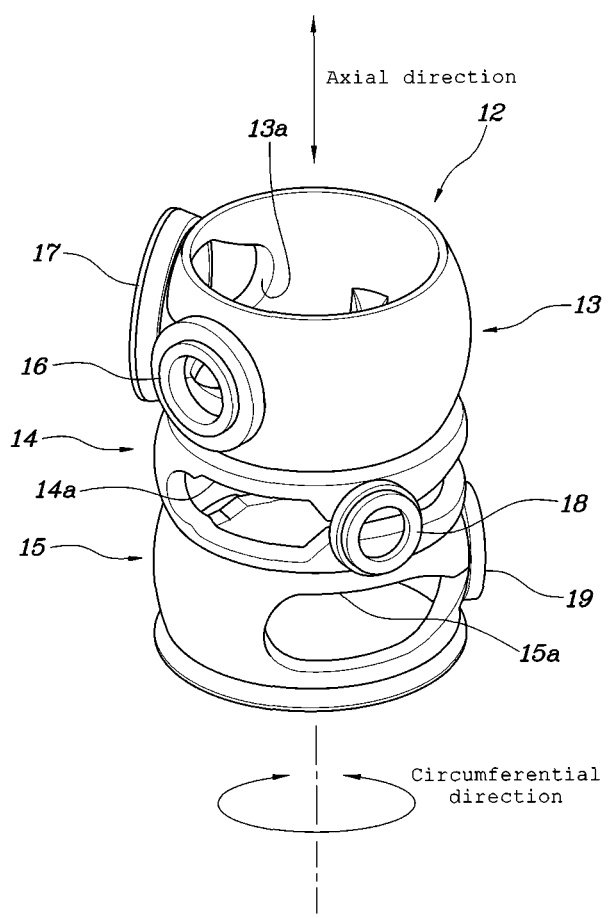
FIG. 3 is a view illustrating an example of a shape of a valve body embedded in the flow control valve of FIG. 2 and a structure in which each port is disposed.

Referring to FIGS. 2 and 3, the valve housing 10 may include the block port 16, the radiator port 17, the heat exchanger port 18, and the heater core port 19 in order to introduce a coolant inside the valve housing 10, the coolant being discharged from the engine 20, and to discharge the introduced coolant.

For example, the block port 16 is connected to the coolant outlet of the cylinder block 20a, and may be disposed through an inner end part of the valve housing 10. The radiator port 17 is connected to a flow passage in which the radiator 30 is disposed, and may be disposed through an inner end part of the valve housing 10, like the block port 16.

In addition, the heat exchanger port 18 is connected to a flow passage in which the heat exchanger, such as an oil cooler or an EGR cooler, is disposed, and may be disposed through an inner middle part of the valve housing 10. The heater core port 19 is connected to a flow passage in which the heater core 50 is disposed, and may be disposed through the other inner end part of the valve housing 10.

For reference, reference numeral 16a illustrated in FIG. 2 indicates a pipeline connected to the block port 16, reference numeral 17a indicates a pipeline connected to the radiator port 17, reference numeral 18a indicates a pipeline connected to the heat exchanger port 18, and reference numeral 19a indicates a pipeline connected to the heater core port 19.

The driving unit 11 is mounted to an upper part of the valve housing 10 to provide rotational force to the valve housing 10, and may be a motor.

The valve body 12 is disposed inside the valve housing 10, and receives a rotational force provided from the driving unit 11, to rotate within a predetermined angular range.

The valve body 12 has a hollow cylindrical shape and has a first flow control hole 13a formed through a side end part thereof to selectively communicate with the block port 16 and the radiator port 17 according changes of a rotation angle of the valve body 12.

The valve body 12 may have a second flow control hole 14a formed through a side middle part thereof to selectively communicate with the heat exchanger port 18, and may have a third flow control hole 15a formed through the other side end part thereof to selectively communicate with the heater core port 19.

That is, when each flow control hole overlaps a port disposed to face the flow control hole, according to rotation of the valve body 12, the port is opened and then allows the flow of coolant. Meanwhile, when each flow control hole does not overlap a port disposed to face the flow control hole, the port is closed and thus does not allow the flow of coolant therethrough.

However, the valve body 12 has an open lower part which is connected to the outlet of the cylinder head 20b, whereby coolant discharged from the cylinder head 20b is constantly introduced inside the valve body 12.

The valve body 12 may include a first layer part 13, a second layer part 14, and a third layer part 15, which are discriminated from each other along a direction of an axis about which the valve body 12 rotates, and may be formed to have a shape in which the first layer part 13, the second layer part 14, and the third layer part 15 are stacked in sequence.

The first layer part 13 has a first flow control hole 13a formed therethrough, which may be formed to be long in a circumferential direction in which the valve body 12 rotates.

The block port 16 and the radiator port 17 may be independently arranged along a circumferential direction of the fast layer part 13.

In addition, the second layer part 14 has the second flow control hole 14a formed therethrough, and the heat exchanger port 18 is disposed on the second layer part 14. The third layer part 15 has the third flow control hole 15a formed therethrough, and the heater core port 19 is disposed on the third layer part 15. The second flow control hole 14a and the third flow control hole 15a may also be formed to be long in the circumferential direction of the valve body 12.

Specifically, when two ports are positioned on an identical layer, opening degrees of the two ports may interfere with each other. However, the block port 16 for separately cooling the cylinder block 20a mainly performs an ON or OFF function. Therefore, the opening degree of the block port 16 may relatively slightly interfere the opening degree of a port positioned on an identical layer to the block port 16.

Therefore, the block port 16 and the radiator port 17 are equally disposed on the first layer part 13, and the heat exchanger port 18 and the heater core port 19, which are controlled in a large operation area, are respectively disposed on the second layer part 14 and the third layer part 15, so as to improve the freedom of design.

The radiator port 17 may be configured to be opened before the block port 16 according to the rotation of the valve body 12 from the one end to the other end among the entire rotation section of the valve body 12.

For example, when the entire rotation section of the valve body 12 corresponds to a value of 0-270°, the one end may correspond to a value of 0°, and the other end may correspond to a value of 270°. When the first flow control hole 13a starts to be opened while overlapping the radiator port 17, at a position of 50°, according to the rotation of the valve body 12, the first flow control hole 13a may start to be opened while overlapping the block port 16, at a position of 128°.

The radiator port 17 may be formed to have an inside diameter larger than that of the block port 16. Accordingly, the block port 16 may be configured to start to be opened before reaching a time point at which the radiator port 17 is maximally opened according to the rotation of the valve body 12 from the one end to the other end.

That is, since the radiator port 17 has an inside diameter wider than that of the block port 16, opening of a path of the block port 16 can be controlled depending on the path opening state of the radiator port 17.

To this end, it is important to determine a relative position of the block port 16 with respect to the radiator port 17, and the position may determine opening start points of the radiator port 17 and the block port 16.

The present disclosure may design an angle of an opening time point of the block port 16 using the following formula:

$$\Theta_{BOP} = \Theta_{ROP} + \Theta_{RP\text{-}BP} - \{\Theta_R/2 + \Theta_B/2)\},$$

$\Theta_{BOP}$: an angle of an opening time point of the block port;

$\Theta_{ROP}$: an angle of an opening time point of the radiator port;

$\Theta_R$: an angle formed by an inside diameter of the radiator port;

$\Theta_B$: an angle formed by an inside diameter of the block port; and $\Theta_{RP\text{-}BP}$: an angle between center angles of the angles formed by the inside diameters of the radiator port and the block port.

That is, referring to FIG. 5, when $\Theta_{ROP}$ is a value of 50°, $\Theta_R$ is a value of 72°, $\Theta_B$ is a value of 38°, and $\Theta_{RP\text{-}BP}$ is a value of 610, an angle $\Theta_{BOP}$ of an opening time point of the block port may be calculated to be a value of 128° by the above calculation formula. $\Theta_R$ and $\Theta_B$ are constants determined when an engine cooling system is designed. Therefore, an angle $\Theta_{BOP}$ of an opening time point of the block port may be determined by appropriately setting the value of $\Theta_{RP\text{-}BP}$.

In the present disclosure, the first flow control hole 13a overlaps and then communicates with the radiator port 17 and the block port 16, and thus allows flowage of a coolant.

Figure 4:
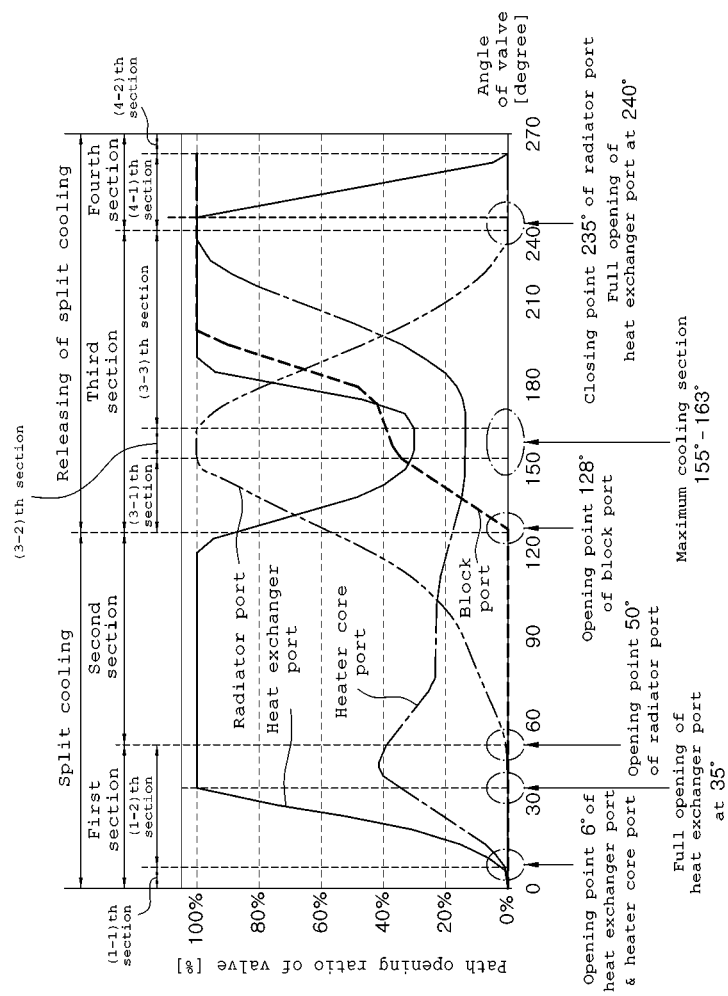
FIG. 4 is a path opening graph of a flow control valve according to the present disclosure.

In explaining the above in reference with FIG. 4, in a predetermined first section including the one end among the entire rotation section of the valve body 12, the first flow control hole 13a may be formed such that the first flow control hole 13a does not overlap either the radiator port 17 or the block port 16.

In a predetermined second section extending from the first section and connected to an opposite side of the first section, the first flow control hole 13a may be formed such that the first flow control hole 13a overlaps the radiator port 17 and does not overlap the block port 16.

In a predetermined third section extending from the second section and connected to an opposite side of the second section, the first flow control hole 13a may be formed to overlap both the radiator port 17 and the block port 16.

In a predetermined fourth section which extends from the third section, is connected to an opposite side of the third section, includes the other end, the first flow control hole 13a may be formed such that the first flow control hole 13a does not overlap the radiator port 17 and overlaps the block port 16.

Figure 6A:
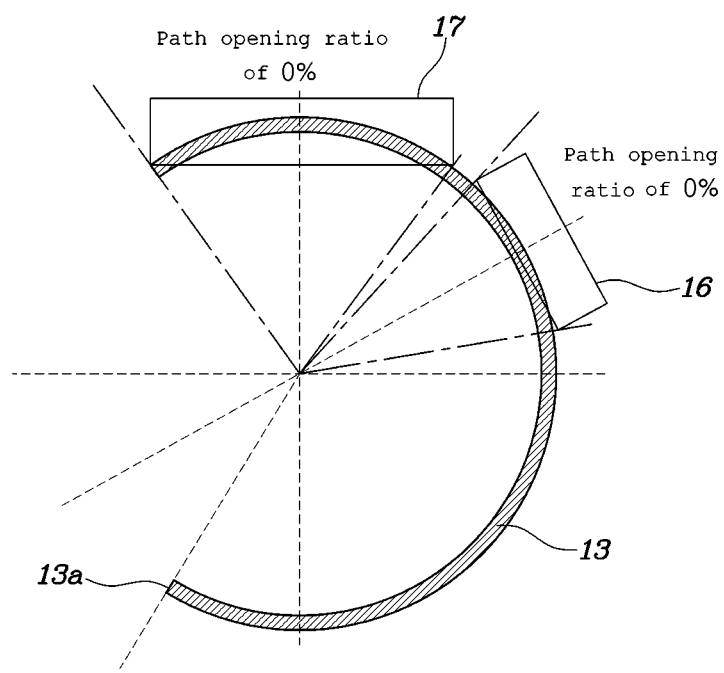
FIGS. 6A to 6D are exemplary diagrams for explaining changing in opening degrees of a block port and a radiator port, depending on rotation of a valve body according to the present disclosure.

For example, the first section may correspond to a section less than 50° among the entire rotation section of the valve body 12. In the first section, as illustrated in FIG. 6A, an outside of the first layer part 13 blocks the radiator port 17 and the block port 16. Therefore, coolant is not introduced from the cylinder block 20*a* into the valve body 12, and is not introduced to the radiator 30 side.

Figure 6B:
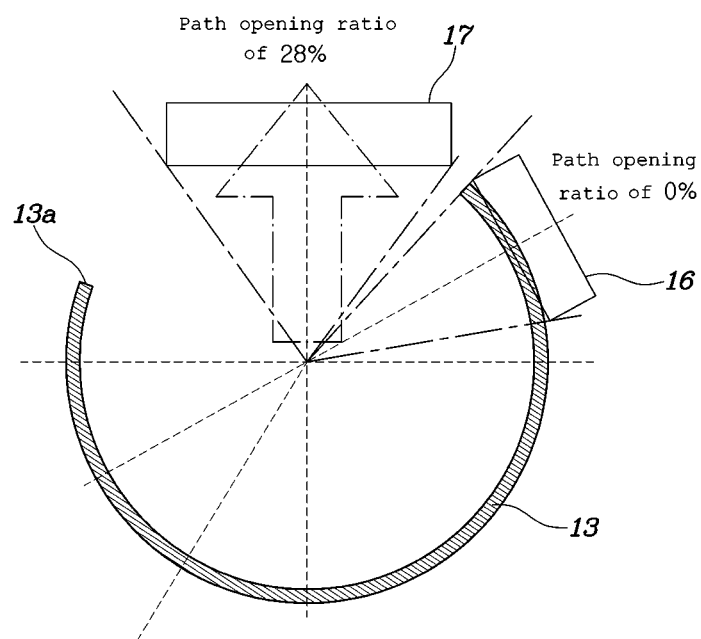

Further, the second section may correspond to a section which has a value from 50° to smaller than 128°. In the second section, as illustrated in FIG. 6B, the outside of the first layer part 13 blocks the block port 16, so that coolant is not introduced from the cylinder block 20*a* into the valve body 12. However, the first flow control hole 13*a* overlaps a part or all of the radiator port 17, so that coolant may be introduced to the radiator 30 side.

Specifically, when the radiator port 17 is opened for temperature control in order to maintain the temperature of a coolant in the engine 20 at a predetermined temperature, the temperature control may be alternately performed in the first section and the second section.

Figure 6C:
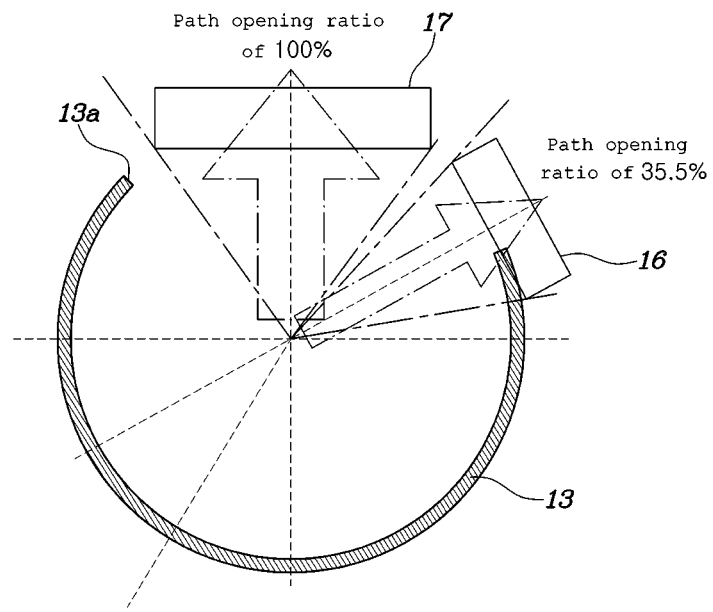

Next, the third section may correspond to a section which has a value from 128° to smaller than 235°. In the third section, as illustrated in FIG. 6C, the first flow control hole 13*a* overlaps a part or all of the block port 16 and a part or all of the radiator port 17. Therefore, coolant may be introduced from the cylinder block 20*a* into the valve body 12, and may be introduced to the radiator 30 side.

Figure 6D:
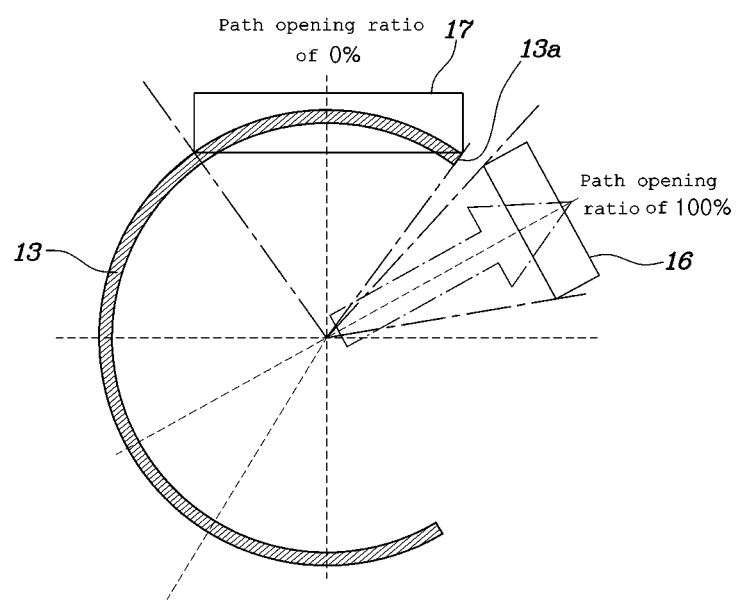

Also, the fourth section may correspond to a section which has a value of 235°-270° inclusive. In the fourth section, as illustrated in FIG. 6D, the outside of the first layer part 13 blocks the radiator port 17, so that coolant is not introduced to the radiator 30 side. However, the first flow control hole 13*a* overlaps a part or all of the block port 16, so that coolant may be introduced from the cylinder block 20*a* into the valve body 12.

Specifically, when heat radiation characteristics deteriorates due to a low vehicle speed or a hill climbing condition, the opening degree of the radiator port 17 is gradually increased, and the block port 16 starts to be partially opened. As described above, control may be alternately performed in the second section and the third section in order to maintain both boiling and durable stability of the engine 20.

In a hill climbing condition, a high-speed high-load condition, or a first heating condition, control may be alternately performed in the third section and the fourth section.

Referring to FIG. 4, the third section may include a (3-1)th section, a (3-2)th section, and a (3-3)th section.

First, the (3-1)th section extends from the second section. Additionally, an overlapping state between the first flow control hole 13*a* and the block port 16 may be changed at a boundary point between the (3-1)th section and the second section.

The (3-2)th section extends from the (3-1)th section and is connected to an opposite side of the (3-1)th section. In the (3-2)th section, the radiator port 17 may have a maximum overlapping area with the first flow control hole 13*a*.

The (3-3)th section is disposed between the (3-2)th section and the fourth section. Additionally, an overlapping state between the first flow control hole 13*a* and the radiator port 17 may be changed at a boundary point between the (3-3)th section and the fourth section.

For example, the (3-1)th section may correspond to a section in which an operation angle of the valve body 12 has a value from 128° to smaller than 155°. The block port 16 starts to be opened at the operation angle of 128°.

For example, the (3-2)th section may correspond to a section in which an operation angle of the valve body 12 has a value of 155°-163° inclusive. In the (3-2)th section, the radiator port 17 is 100% opened so as to exhibit maximum cooling performance.

Also, the (3-3)th section may correspond to a section in which an operation angle of the valve body 12 has a value more than 163° but less than 235°. The radiator port 17 is closed at the operation angle of 235°.

That is, when the heat radiation characteristics of a vehicle start to deteriorate, a temperature of an outlet-side coolant of the radiator 30 is gradually increased. Accordingly, an opening degree of the radiator port 17 is gradually increased in order to constantly maintain the temperature of the coolant introduced into the engine 20.

Also, when the heat radiation characteristics of a vehicle get worse, the ability to discharge the transferred heat amount of the engine 20 to the outside is also weakened. Therefore, the present disclosure enables flow stagnation in the cylinder block 20*a* to be partially released so as to prevent boiling in the cylinder block 20*a*.

Meanwhile, in a general condition in which the heat radiation condition for the radiator is favorable, the cylinder block 20*a* is separately cooled, thereby increasing the coolant temperature in the cylinder block 20*a*. Therefore, friction is reduced.

To this end, the block port 16 is opened before the radiator port 17 enters a maximum cooling section (for example, 10°-40° before the entering). The block port 16 is controlled to be opened at a predetermined area or more before the maximum cooling section, that is, a condition in which the radiator port 17 is 100% opened.

Figure 7:
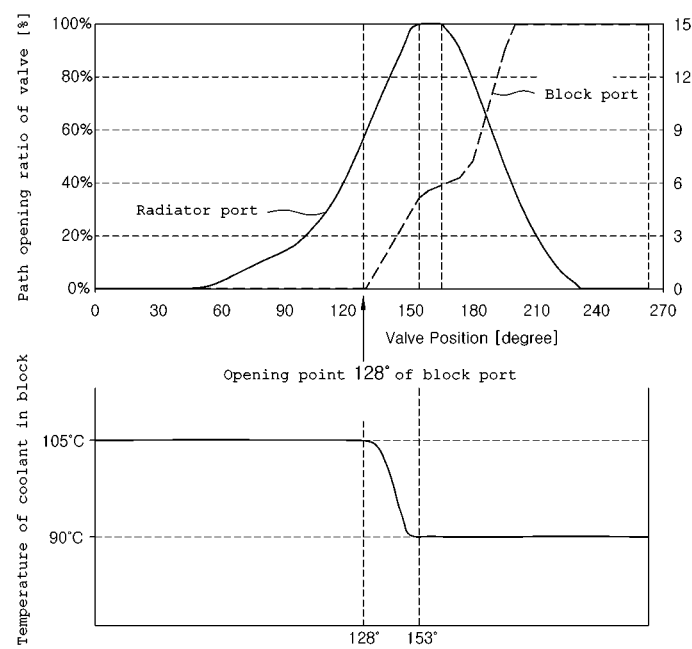
FIG. 7 is a graph showing a change in coolant temperature depending on opening of a block port according to the present disclosure.

For example, when a diameter of the block port 16, which is converted from the section, is opened at about 4 mm or more, a temperature of a coolant in the cylinder block 20*a* is rapidly decreased. Eventually, as illustrated in FIG. 7, in a maximum cooling section, in which the radiator port 17 is maximally opened, a temperature of a coolant in the cylinder block 20*a* is controlled to be identical to that of an outlet of the engine.

Meanwhile, the present disclosure may configure the heat exchanger port 18 and the heater core port 19 to be opened before the radiator port 17, according to a rotation of the valve body 12 from the one end to the other end.

The heater core port 19 and the heat exchanger port 18 may be configured to start opening at the same time, but may be configured such that the heater core port 19 is opened before the heat exchanger port 18.

In the present disclosure, as the second flow control hole 14*a* overlaps the heat exchanger port 18, the second flow control hole 14*a* communicates with the heat exchanger port 18 to allow the flow of coolant.

In explaining the above in reference with FIG. 4, among the entire rotation section of the valve body 12, in a (1-1)th section including the one end and being shorter than the first section, the second flow control hole 14*a* may be formed such that the second flow control hole 14*a* does not overlap the heat exchanger port 18.

In a (1-2)th section extending from the (1-1)th section and connected to an opposite side of the (1-1)th section, the second section, the third section, and a (4-1)th section which extends from an opposite side of the third section, and is shorter than the fourth section, the second flow control hole 14*a* may be formed to overlap the heat exchanger port 18.

Also, in a (4-2)th section which includes the other end, extends from the (4-1)th section, and is connected to an opposite side of the (4-1)th section, the second flow control hole 14*a* may be formed such that the second flow control hole 14*a* does not overlap the heat exchanger port 18.

For example, the (1-1)th section may correspond to a section less than 6° among the entire rotation section of the valve body 12. In the (1-1)th section, an outside of the second layer part 14 blocks the heat exchanger port 18, so that coolant is not introduced to the heat exchanger 40 side, which is embodied as, for example, an oil cooler or an EGR cooler. That is, the (1-1)th section corresponds to a flow stop section in which coolant is controlled to stop flowing, and in the (1-1)th section, coolant flow to the heat exchanger 40 side is restricted.

The (1-2)th section may correspond to a section having a value from 6° to smaller than 50°. In the (1-2)th section, as the second flow control hole 14*a* overlaps a part of the heat exchanger port 18, a coolant may be introduced to the heat exchanger 40 side.

Also, the (4-1)th section may correspond to a section having a value from 235° to smaller than 265°. In the (4-1)th section, as the second flow control hole 14*a* overlaps a part or all of the heat exchanger port 18, a coolant may be introduced to the heat exchanger 40 side.

In the (4-1)th section, the radiator port 17 is converted into a closed state at an operation angle of 235°. In the section having a value from 235° to smaller than 240°, the second flow control hole 14*a* may be formed to overlap the entire heat exchanger port 18 so as to completely open the heat exchanger port 18.

And, a (4-2)th section may correspond to a section having a value of 265°-270° inclusive. In the (4-2)th section, the outside of the second layer part 14 blocks the heat exchanger port 18, so as to prevent coolant from being introduced to the heat exchanger 40 side. That is, the fourth section including the (4-2)th section corresponds to a first heating section in which a maximum operation of a heater is required. Particularly, in the (4-2)th section, the heat exchanger port 18 is blocked to maximize the flow rate of coolant of the heater core 50 side.

In a section, among the third section, in which the radiator port 17 has a maximum overlapping area with the first flow control hole 13*a*, the second flow control hole 14*a* may be formed such that the heat exchanger port 18 has a minimum overlapping area with the second flow control hole 14*a*.

For example, in the section of the valve body 12 having an operation angle of 155°-163° inclusive, in which the radiator port 17 has a maximum opening area, the flow rate of coolant in the radiator 30 is required to be increased. Therefore, the oil cooler or the EGR cooler is allowed to have only minimum flow introduced therein, so as to reduce coolant flow.

In order to control the flow rate of the heat exchanger port 18 as described above, the second flow control hole 14*a* may be formed to have an axial width of a middle portion narrower than that of the remaining part.

Figure 8A:
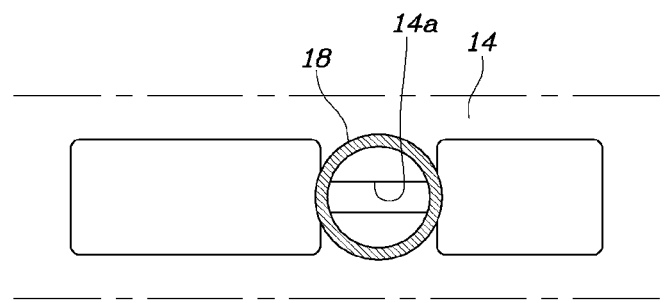
FIGS. 8A to 8C are schematic diagrams for explaining changing in an opening degree of a heat exchanger port depending on rotation of a valve body according to the present disclosure.

That is, in the section in which the radiator port 17 has the maximum opening area, as illustrated in FIG. 8A, the middle portion of the second flow control hole 14*a* overlaps the heat exchanger port 18.

Figure 8B:
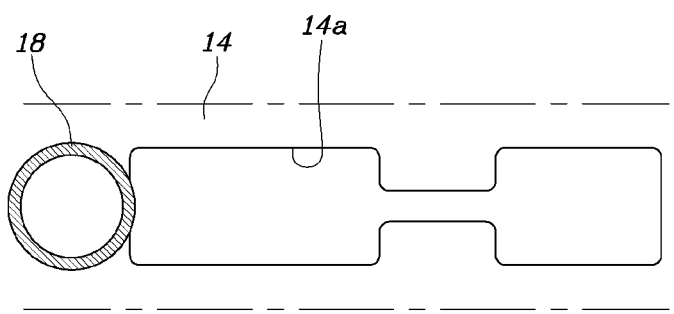

And, in a section in which flow stop control is required, as illustrated in FIG. 8B, the heat exchanger port 18 is blocked by the outside of the second layer part 14 extending from a left end of the second flow control hole 14*a* so as to restrict flow of coolant.

Figure 8C:
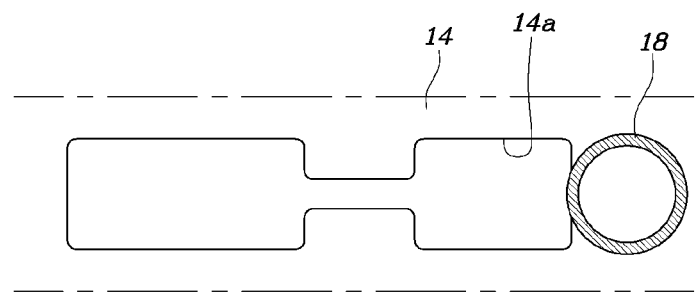

Also, in a section in which a first heating operation is required, as illustrated in FIG. 8C, the heat exchanger port 18 is blocked by the outside of the second layer part 14 extending from a right end of the second flow control hole 14*a* so as to restrict flow of coolant.

Meanwhile, in the present disclosure, as the third flow control hole 15*a* overlaps the heater core port 19, the third flow control hole 15*a* communicates with the heater core port 19, to allow the flow of coolant.

In explaining the above in reference with FIG. 4, in a (1-1)th section among the entire rotation section of the valve body 12, the (1-1)th section including the one end and being shorter than the first section, the third flow control hole 15*a* may be formed such that the third flow control hole 15*a* does not overlap the heater core port 19.

And, in a (1-2)th section extending from the (1-1)th section and connected to an opposite side of the (1-1)th section, the second section, the third section, and the fourth section, the third flow control hole 15*a* may be formed to overlap the heat core port 18.

For example, the (1-1)th section may correspond to a section less than a value of 6° among the entire rotation section of the valve body 12. In the (1-1)th section, an outside of the third layer part 15 blocks the heater core port 19, so that coolant is not introduced to the heater core 50 side. That is, the (1-1)th section corresponds to a flow stop section in which coolant is controlled to stop flowing, and in the (1-1)th section, coolant flow to the heater core 50 is restricted.

And, the (1-2)th to third sections may correspond to a section having a value from 60 to smaller than 235°. In the (1-2)th to third sections, as the third flow control hole 15*a* overlaps a part of the heater core port 19, coolant may be introduced to the heater core 50 side.

And, a fourth section may correspond to a section having a value of 235°-270° inclusive. In the fourth section, the third flow control hole 15*a* overlaps the entire heater core port 19 to allow a large amount of coolant to be introduced to the heater core 50 side. That is, the fourth section corresponds to a first heating section in which a heater is required to maximally operate, and in the fourth section, the heater core port 19 may be configured to be in a completely opened state in order to maximize coolant flow of a heater core 50 side.

In a section, among the third section, in which the radiator port 17 has a maximum overlapping area with the first flow control hole 13*a*, the third flow control hole 15*a* may be formed such that the heater core port 19 has a minimum overlapping area with the third flow control hole 15*a*.

For example, in the section of the valve body 12 having an operation angle 155°-163° inclusive, in which the radiator port 17 has a maximum opening area, the flow rate of coolant in the radiator 30 is required to be increased. Therefore, the heater core 50 is allowed to have only a minimum coolant flow introduced therein, so as to reduce a coolant flow.

In order to control the flow rate of the heater core port 19 as described above, the third flow control hole 15*a* may be formed such that an axial width of a middle portion thereof is narrower than that of the remaining part thereof.

Figure 9A:
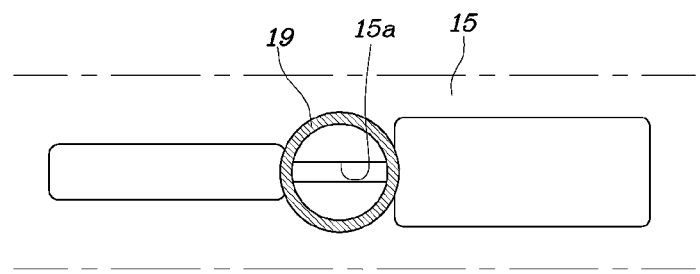
FIGS. 9A to 9C are schematic diagrams for explaining changing in an opening degree of a heater core port depending on rotation of a valve body according to the present disclosure.

That is, in the section in which the radiator port 17 has the maximum opening area, as illustrated in FIG. 9A, the middle portion of the third flow control hole 15*a* overlaps the heater core port 19.

Figure 9B:
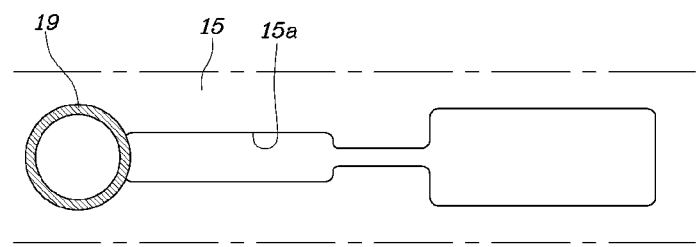

And, in a section in which a flow stop control is required, as illustrated in FIG. 9B, the heater core port 19 is blocked by the outside of the third layer part 15 extending from a left end of the third flow control hole 15*a* so as to restrict flow of coolant.

Figure 9C:
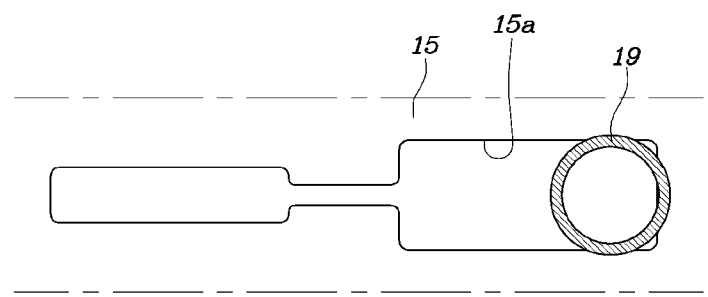

Also, in a section in which a first heating operation is required, as illustrated in FIG. 9C, a right end of the third flow control hole 15*a* overlaps the heater core port 19, so as to enable a large amount of coolant to flow.

Meanwhile, the flow control valve 1 according to the present disclosure can control coolant flow rate by changing path opening ratios of the ports upon changes in an operation angle of the valve body 12, which is rotatable by the rotational force of the driving unit 11.

The provided FIG. 4 illustrates a path opening graph of the flow control valve 1 according to the present disclosure. In the following description, a configuration in which changing the operation angle of the valve body 12 causes a change in path opening ratio of each port will be described. First, the X axis of the path opening graph corresponds to the total rotation angle of the valve (a section between the left end and the right end), and the Y axis indicates the path opening ratio of a port.

In this way, the total rotation angle of the flow control valve 1 may be determined in a predetermined angular range. When an operation angle is changed within the total rotation angle on the basis of the driving state of a vehicle, the radiator port 17, the heat exchanger port 18, the heater core port 19, and the block port 16 have changing opening degrees depending on the changing angle.

With respect to the opened state of each port depending on a rotation of the flow control valve 1, the radiator port 17 has a maximum path opening ratio in a section of an operation angle of 155-163°, so as to be in a completely opened state. Simultaneously, the heat exchanger port 18 and the heater core port 19 have decreased path opening ratios, so as to further increase flow to the radiator port 17. Accordingly, the radiator 30 has maximized heat radiation performance.

As the valve body 12 starts to deviate from the maximum cooling section by rotating in a clockwise or a counterclockwise direction through operation of the flow control valve 1, an opening degree of the radiator port 17 is gradually decreased.

Also, the radiator port 17 is switched to a closed state before the flow control valve 1 reaches the one end or the other end from the maximum cooling section D.

The block port 16 starts to open before the radiator port 17 enters the maximum cooling section, on the basis of a direction in which the valve body 12 rotates from one side to the other side. That is, on the basis of the opening time point of the block port 16, in operation section toward the one side, the block port 16 is closed, so as to implement split cooling for the cylinder block 20a. And, in operation section toward the other side, the block port 16 is opened, so as to stop split cooling for the cylinder block 20a.

That is, as the block port 16 is opened or closed by the operation of the flow control valve 1, split cooling of the cylinder head 20b and the cylinder block 20a can be applied or not applied. Also, the opening degrees of the radiator port 17, the heat exchanger port 18, and the heater core port 19 are controlled together, so as to enable four-port control in which the four ports are controlled to be changed at once by the operation of only the flow control valve 1.

Therefore, the flow control valve 1 implements a split cooling technique to improve a fuel economy. Further, the flow control valve 1 does not require a separate port control structure in order to implement the split cooling technique, thereby reducing production costs.

Also, the flow control valve 1 has various control sections depending on driving condition of the vehicle and is controlled by sequentially passing the control sections, and thus has a reduced operating distance and number of operations.

Further, since a first heating section F is configured, there is no coolant flow loss due to unnecessary flow to the oil heat exchanger or the EGR cooler while a flow rate to the heater core 50 side is maximized. Therefore, it is possible to maximize the improvement in fuel economy and the heating performance.

A particular embodiment of the present disclosure has been illustrated and described, but various changes and modifications would be obvious to a person ordinarily skilled in the art without departing from the technical idea of the present disclosure, provided by the following claims.

What is claimed is:

1. A flow control valve, comprising:
   a valve housing including a block port connected to a coolant outlet of a cylinder block, a radiator port connected to a radiator, a heat exchanger port connected to an oil cooler or an EGR cooler, and a heater core port connected to a heater core;
   a driving unit that provides a rotational force; and
   a valve body that receives the rotational force provided from the driving unit to rotate in the valve housing at a predetermined angle, and has a first flow control hole, a second flow control hole, and a third flow control hole which are formed through the valve body such that the first flow control hole selectively communicates with the block port and the radiator port, the second flow control hole selectively communicates with the heat exchanger port, and the third flow control hole selectively communicates with the heater core port, according to changes of a rotation angle of the valve body,
   wherein:
      the valve body includes a first layer part, a second layer part, and a third layer part, which are discriminated from each other along an axial direction of the valve body;
      the first layer part has the first flow control hole formed therethrough; and
      the block port and the radiator port are independently arranged along a circumferential direction of the first layer part, and
   wherein:
      the second layer part has the second flow control hole formed therethrough, and the heat exchanger port is disposed on the second layer part; and
      the third layer part has a third flow control hole formed therethrough, and the heater core port is disposed on the third layer part.

2. The flow control valve of claim 1, wherein:
   the first flow control hole, the second flow control hole, and the third flow control hole are respectively arranged through the first layer part, the second layer part, and the third layer part, along circumferential directions of respective parts.

3. The flow control valve of claim 1, wherein:
   the radiator port is configured to be opened before the block port as the valve body rotates from a first end to a second end among an entire rotation section of the valve body.

4. The flow control valve of claim 3, wherein:
   an inside diameter of the radiator port is larger than that of the block port; and
   the block port is configured to start opening before a time point at which the radiator port is maximally opened, as the valve body rotates from the first end to the second end.

5. The flow control valve of claim 4, wherein:
   as the first flow control hole overlaps the radiator port and the block port, the first flow control hole communicates with the radiator port and the block port to allow flow of a coolant;
   the first flow control hole is formed such that the first flow control hole does not overlap either the radiator port or the block port in a predetermined first section including the first end among the entire rotation section of the valve body;

the first flow control hole is formed such that the first flow control hole overlaps the radiator port and does not overlap the block port in a predetermined second section extending from the first section and connected to an opposite side of the first section;

the first flow control hole is formed such that the first flow control hole overlaps both the radiator port and the block port in a predetermined third section extending from the second section and connected to an opposite side of the second section; and the first flow control hole is formed such that the first flow control hole does not overlap the radiator port and overlaps the block port in a fourth section which extends from the third section, is connected to an opposite side of the third section, and includes the second end.

6. The flow control valve of claim 5, wherein the third section comprises:

a (3-1)th section extending from the opposite side of the second section, wherein an overlapping state between the first flow control hole and the block port is converted at a boundary point between the (3-1)th section and the second section;

a (3-2)th section extending from an opposite side of the (3-1)th section, wherein an overlapping area between the first flow control hole and the radiator port is maximized in the (3-2)th section; and a (3-3)th section disposed between the (3-2)th section and the fourth section, wherein an overlapping state between the first flow control hole and the radiator port is converted at a boundary point between the (3-3)th section and the fourth section.

7. The flow control valve of claim 5, wherein:

the heat exchanger port and the heater core port are configured to be opened before the radiator port as the valve body rotates from the first end to the second end.

8. The flow control valve of claim 7, wherein, as the second flow control hole overlaps the heat exchanger port, the second flow control hole communicates with the heat exchanger port to allow flow of a coolant;

the second flow control hole is formed such that the second flow control hole does not overlap the heat exchanger port in a (1-1)th section which is shorter than the first section and includes the first end among the entire rotation section of the valve body;

the second flow control hole is formed to overlap the heat exchanger port in a (1-2)th section extending from the (1-1)th section and connected to an opposite side of the (1-1)th section, the second section, the third section, and a (4-1)th section which extends from the opposite side of the third section and is shorter than the fourth section; and the second flow control hole is formed such that the second flow control hole does not overlap the heat exchanger port in a (4-2)th section which includes the second end, extends from the (4-1)th section, and is connected to an opposite side of the (4-1)th section.

9. The flow control valve of claim 8, wherein:

the second flow control hole is formed such that an axial width of a middle portion thereof is narrower than that of a remaining part thereof.

10. The flow control valve of claim 9, wherein:

as the third flow control hole overlaps the heater core port, the third flow control hole communicates with the heater core port to allow flow of a coolant;

the third flow control hole is formed such that the third flow control hole does not overlap the heater core port in a (1-1)th section which is shorter than the first section and includes the first end among the entire rotation section of the valve body; and the third flow control hole is formed to overlap the heat core port in a (1-2)th section extending from the (1-1)th section and connected to an opposite side of the (1-1)th section, the second section, the third section, and the fourth section.

11. The flow control valve of claim 8, wherein:

the second flow control hole is formed such that the heat exchanger port has a minimum overlapping area with the second flow control hole in a section in which the radiator port has a maximum overlapping area with the first flow control hole among the third section.

12. The flow control valve of claim 11, wherein:

the third flow control hole is formed such that the heater core port has a minimum overlapping area with the third flow control hole in a section in which the radiator port has a maximum overlapping area with the first flow control hole among the third section.

13. The flow control valve of claim 11, wherein:

the third flow control hole is formed such that an axial width of a middle portion thereof is narrower than that of a remaining part thereof.

\* \* \* \* \*